Jan. 12, 1965 W. HENN ETAL 3,165,638
COMMUTATOR CONTROL FOR SIGNAL DERIVATION
Filed June 28, 1960 2 Sheets-Sheet 1
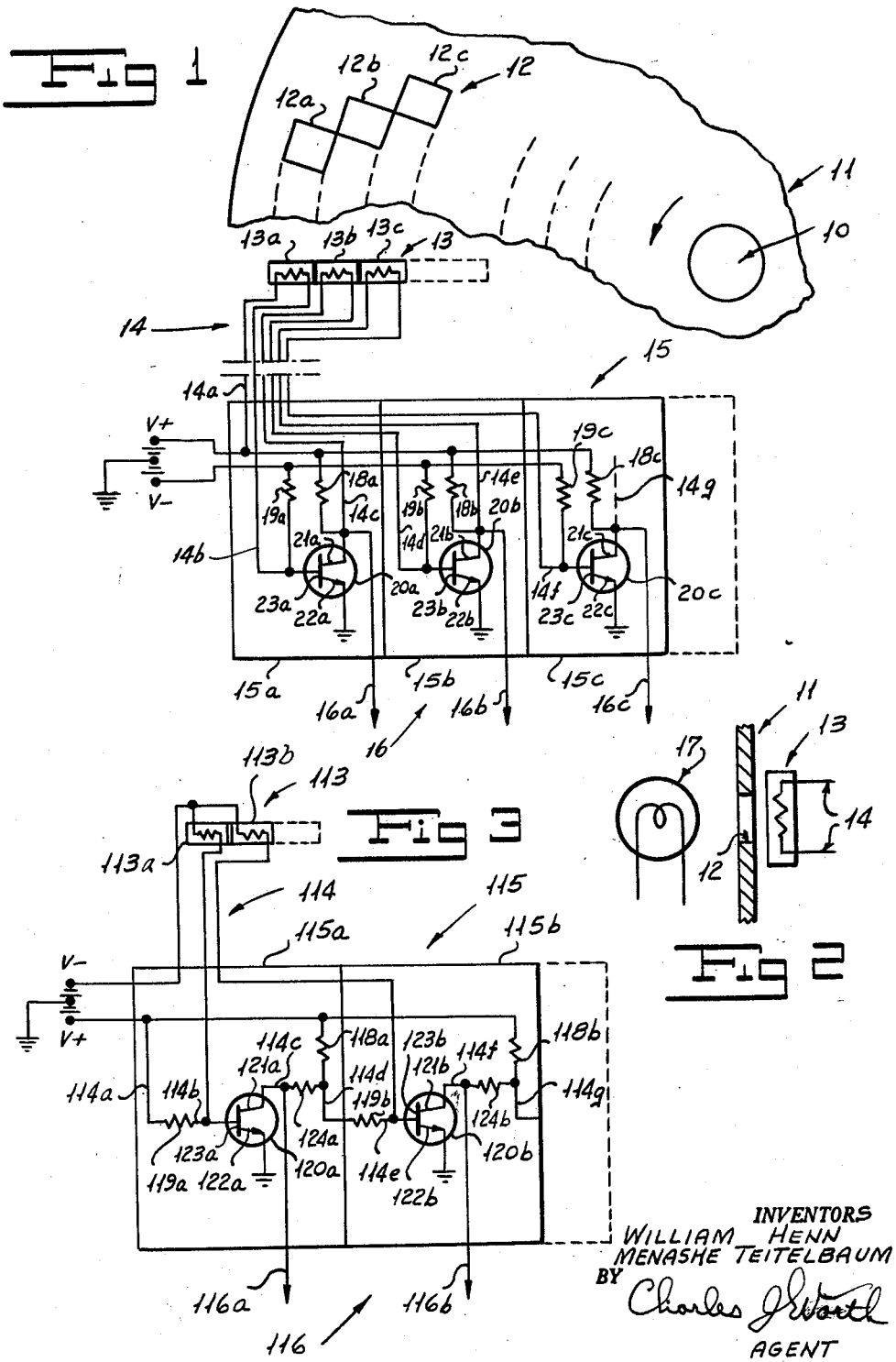
INVENTORS
WILLIAM HENN
MENASHE TEITELBAUM
BY
Charles J. Wirth
AGENT

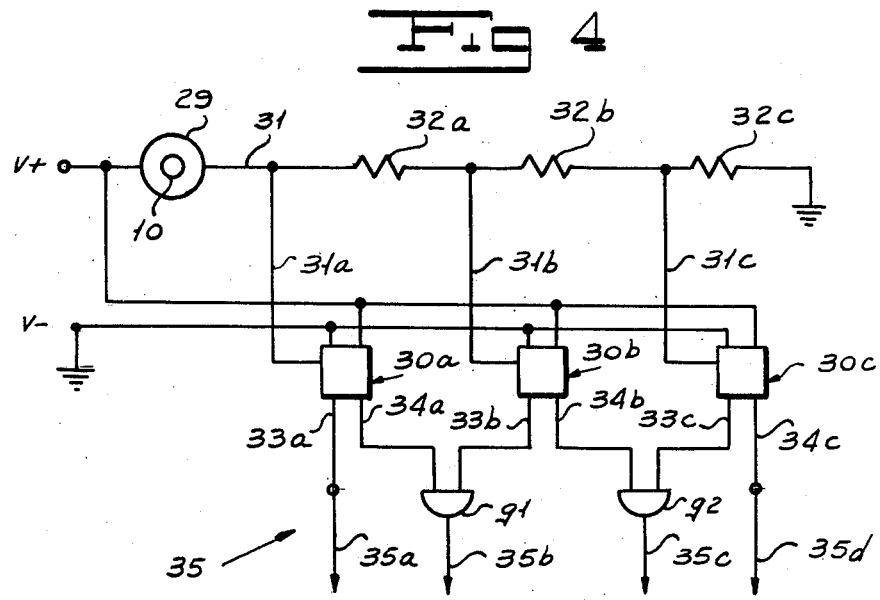
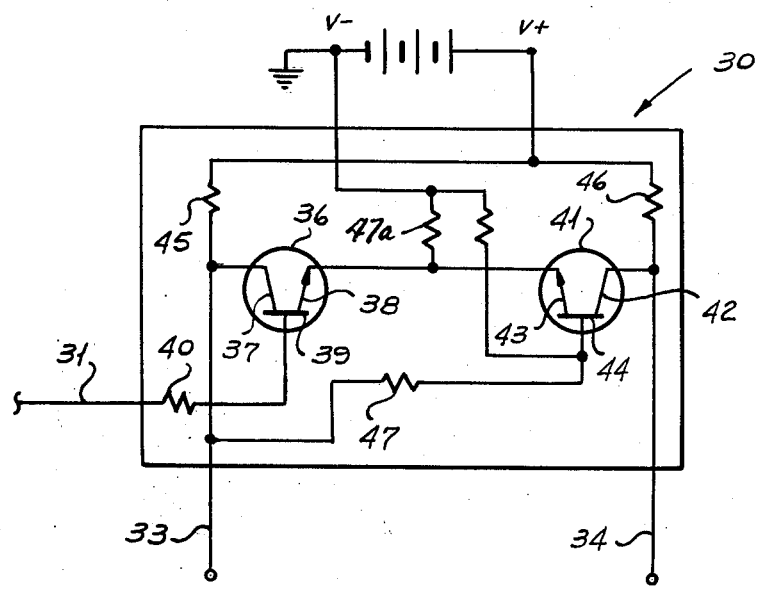

United States Patent Office 3,165,638
Patented Jan. 12, 1965

3,165,638
COMMUTATOR CONTROL FOR SIGNAL
DERIVATION
William Henn, Hasbrouck Heights, N.J., and Menashe
Teitelbaum, Brooklyn, N.Y., assignors to The Bendix
Corporation, Teterboro, N.J., a corporation of Delaware
Filed June 23, 1960, Ser. No. 39,290
10 Claims. (Cl. 307—88.5)

This invention relates to electronic commutating devices for deriving signals representing discrete steps of a continuous input variable.

These devices are particularly adaptable to matrix arrays having a plurality of read-in lines individually and sequentially presenting signals as a function of an input variable.

An object of this invention is to provide an electronic commutating device for producing output signals representing discrete steps of a continuous input variable in which the output signals are of equal amplitude.

Another object of this invention is to provide an electronic device having a plurality of output lines to provide discrete step output signals in accordance with a condition as a function of a continuous input variable in which only one output line presents signals at any one time.

And another object of this invention is to provide a device as described in which the discrete step output signals are provided by an increase or decrease of the potential of one of the output lines.

This invention contemplates a device adapted to receive input signals corresponding to a continuous input variable, and having a plurality of outputs for presenting discrete step output signals which are a function of the input variable. A plurality of transistors are collector-to-base connected to singularly vary the voltage amplitude of the output lines to provide the output signals, and to prevent multiple output signals.

The foregoing and other objects and advantages of the invention will appear more fully hereinafter from a consideration of the detailed description which follows, taken together with the accompanying drawings wherein three embodiments of the invention are illustrated by way of example. It is to be expressly understood, however, that the drawings are for illustration purposes only and are not to be construed as defining the limits of the invention.

FIGURE 1 is a diagrammatic showing of a novel device constructed according to the invention with representative photoelectric means providing an input variable, FIGURE 2 is a sectional view of the photoelectric means of FIGURE 1, FIGURE 3 is a diagrammatic showing of a modification of the device of FIGURE 1 with photoelectric means providing an input variable, FIGURE 4 is a diagrammatic showing of a modified device constructed according to the invention and having a variable direct voltage input, and, FIGURE 5 is a circuit diagram of an emitter coupled multivibrator illustrative of the control circuits of FIGURE 4.

To provide a signal representing a discrete step of an input variable, the output line presenting the signal is not necessarily energized but should be singularly in an electrical state which is diverse from the electrical state of the remaining signal lines. As shown in FIGURE 1, the signal presenting or output lines 16, are continuously energized to a predetermined high level except the one line that goes low to present the discrete step signal. FIGURES 3 and 4 show modified arrangements constructed according to the invention in which the line presenting the signal is energized above a low level of the remaining output lines. A common output signal voltage source is connected to all control circuits of each commutating control device to provide output signals of equal amplitude uneffected by the saturating current bias applied to the bases of the transistors.

Referring to FIGURES 1 and 2, only three control circuits are shown and described to facilitate presenting the invention. A rotatable shaft 10 is angularly positioned by an input variable to represent its quantative value. An opaque disc 11 is fixed to the shaft 10 and has a transparent area 12 comprised of segments 12a, 12b and 12c sequentially positioned radially inwardly toward the center of rotation of the shaft, and angularly displaced from one another. As the disc 11 is rotated, the individual transparent segments 12a, 12b and 12c sequentially align with a sensor 13 to pass light from a source 17 to light responsive, variable resistance sensor elements 13a, 13b and 13c, respectively. This control means varies the input voltage to the control circuits 15a, 15b or 15c of an amplifier and control network 15, to provide the discrete step signals presented by respective circuit lines 16a, 16b and 16c which form the output 16 of the signal commutating device. Lines 14 interconnect the sensor 13 and the network 15, and provide an interlock between circuits 15a, 15b and 15c as will be further described.

A line 14a, connected to a positive direct voltage source V+ is connected to the first side of the light responsive, variable resistance element 13a. The second side of element 13a is connected to the base 23a of a transistor 20a, in circuit 15a, by a line 14b connected to a negative direct voltage source V— by a resistor 19a. The output line 16a is connected to a line 14c which connects the collector 21a of transistor 20a to the first side of element 13b. The voltage source V+ is connected to line 14c by a resistor 18a. The second side of element 13b is connected to the base 23b of a transistor 20b by a line 14d connected to source V— by a resistor 19b. The output line 16b is connected to a line 14e which connects the collector 21b of transistor 20b to the first side of element 13c. A resistor 18b connects line 14e to the source V+. The second side of element 13c is connected to the base 23c of a transistor 20c by a line 14f connected to the source V— by a resistor 19c. The output line 16c and the collector 21c of the transistor 20c are connected to a line 14g which goes to the next light responsive variable resistance element of network 15 (not shown). The line 14g is connected to the source V+ by a resistor 18c. The emitters 22a, 22b and 22c of the transistors 20a, 20b and 20c, respectively, are connected to ground.

Positive direct voltage from source V+ is applied to lines 14b, 14d and 14f through resistors 13a, 18a and 13b, and 18b and 13c, respectively. Lines 14b, and 14f are also connected to the direct negative voltage source V— by resistors 19a, 19b and 19c, respectively. In the absence of light impinging on elements 13a, 13b and 13c, the current applied to the transistor bases 23a, 23b and 23c by lines 14b, 14d and 14f, respectively, is below a level required to bias the transistors or semiconductor devices 20a, 20b and 20c to conduct. As a result, positive direct voltage from the source V+ applied to resistors 18a, 18b and 18c provides high level potential or no signal in the output lines 16a, 16b and 16c.

As the shaft 10 with the mounted disc 11 rotates in response to the input variable, corresponding to the first step level, the transparent area 12 approaches the sensor 13 until the first segment 12a aligns with element 13a and passes light from the source 17 to the first light responsive, variable resistance element 13a. Light impinging on element 13a reduces its resistance, increasing the potential of line 14b and providing saturation current to base 23a. The transistor 20a conducts heavily causing a drop of potential at line 14c and output line 16a. The lowered potential of line 16a provides the first step signal. Of course, with reduced potential at line 14c, the potential of line 14d is also reduced so that transistor 20b remains nonconducting and output line 16b remains at a high potential.

If shaft 10 with disc 11 is additionally rotated to an intermediate position where segments 12a and 12b are both passing light from the source 17 to both elements 13a and 13b, the lowered potential of line 14c applied to the element 13b, even though the resistance of element 13b is reduced because of the light impinging on it, provides insufficient current to base 23b to cause the transistor 20b to conduct. Therefore, the potential of output line 16b remains at a high level and provides no signal.

As shaft 10 and disc 11 further rotates to a position corresponding to the second step level of the input variable, segment 12a moves out of alignment with and prevents light from impinging on element 13a, and simultaneously segment 12b aligns with element 13b to pass light from source 17 to element 13b. In the absence of light, the resistance of element 13a returns to its high level, and with resistor 19a causes the potential of line 14b to drop below the minimum required to maintain the transistor 20a in a conducting state. With the transistor 20a nonconducting, the potential of lines 14c and 16a increases to a high level, rescinding the first step signal presented by output line 16a. Simultaneously, high level potential is applied to element 13b, now of reduced resistance, and to line 14d, and saturating current to base 23b causes transistor 20b to conduct heavily. With transistor 20b conducting, the potential of lines 14e and 16d drops and provides the second step signal in output line 16b. The low potential of line 14e prevents concurrent biasing of transistor 20c to a conducting state.

When the input variable is at a third step level, shaft 10 and disc 11 are further rotated to move segment 12b out of alignment with and to exclude light from element 13b, and to simultaneously align segment 12c with element 13c to pass light from source 17 to element 13c. In the absence of light, the resistance of element 13b returns to a high level causing the potential of line 14d to drop below the minimum required to maintain transistor 20b in a conducting state. With transistor 20b nonconducting, the potential of lines 14e and 16b increases to a high level, rescinding the second step signal presented by output line 16b. Simultaneously, high level potential is applied to element 13c, now of reduced resistance, and to line 14f, and saturating current to base 23c causes transistor 20c to conduct heavily. With transistor 20c conducting, the potential of lines 14g and 16c drops and provides the third step signal in output line 16c.

Referring now to FIGURE 3 a device similar to that of FIGURE 1 is shown in which the output signals representing discrete steps of the input variable are provided by increased potentials of the output lines 116. A sensor 113, corresponding to sensor 13, comprised of light responsive, variable resistance elements 113a and 113b, is connected to a control and amplifying network 115 by lines 114, and to a direct negative voltage source V−. The network 115 includes two control circuits, 115a and 115b having signal output lines 116a and 116b, respectively. A line 114a, connected to a positive direct voltage source V+, is connected to a line 114b by a resistor 119a. The line 114b is connected to the one side of element 113a and to the base 123a of a transistor 120a. The collector 121a of transistor 120a is connected to output line 116a by a line 114c, and to a resistor 124a connected to the line 114d. A resistor 118a connects resistor 124a and line 114d to the positive direct voltage source V+. A resistor 119b connects line 114d to a line 114e that is connected to one side of element 113b and to the base 123b of a transistor 120b. The collector 121b of transistor 120b is connected to output line 116b and a resistor 124b by a line 114f. The resistor 124b is connected to the direct positive voltage source V+ by a resistor 118b and to a line 114g. If FIGURE 3 showed the additional control circuits of the network 115, the line 114g would be connected to the base of the transistor in the following circuit in a manner corresponding to the circuits 115a and 115b.

The rotatable shaft 10, the opaque disc 11 including the transparent area 12, and the light source 17 of FIGURES 1 and 2, provide the input variable in the manner previously described. With no light impinging on sensor 113, positive voltage applied to resistors 119a and 119b and with elements 113a and 113b provides high potential at lines 114b and 114e and saturating current to bases 123a and 123b so that transistors 120a and 120b conduct. With transistors 120a and 120b conducting, the potential of lines 114c and 114f, and 116a and 116b drops while the potential of the lines 114d and 114e is sufficiently high to provide saturating current to base 123b because of resistor 124a.

When shaft 10 and disc 11 are rotated in response to the input variable equal to the first discrete step, segment 12a aligns with element 113a and passes light from source 17 to element 113a causing reduced resistance so the potential of line 114b is insufficient to maintain the transistor 120a conducting. With the transistor 120a nonconducting, the potential of lines 114c and 116a rises and provides a signal representing the first discrete step of the input variable in output line 116a.

With high level potential at line 114c, reducing the resistance of element 113b upon partial exposure to the light source 17 never sufficiently reduces the potential of line 114e to remove the biasing current from base 123b. Therefore, transistor 120b continuously conducts until shaft 10 with disc 11 rotates in response to the input variable to a position corresponding to the second step level. In this position, segment 12a is out of alignment with and prevents light from impinging upon element 113a. Simultaneously, segment 112b aligns with element 113b and passes light from the source 17 to the element 113b to reduce its resistance. In the absence of light, the resistance of element 113a returns to its high level, increasing the potential of line 114b, and saturating current to base 123a causes transistor 120a to conduct. With transistor 120a conducting, the potential of lines 114c and 116a is low, rescinding the signal representing the first step of the input variable, and with the reduced resistance of element 113b, in the presence of light, causes the potential of the line 114e to drop to its low value insufficient to maintain transistor 120b conducting. With transistor 120b nonconducting, potential of line 114b rises and prevents simultaneous nonconductance by the following transistor (not shown). The potential of output line 116b is also high and provides the signal representing the second discrete step of the input variable.

FIGURES 4 and 5 show a modified signal commutating device that is further modified to include electronic means to provide a single source of variable input voltage in place of the photoelectric means of FIGURES 1 to 3. Referring specifically to FIGURE 5, a transistorized, voltage sensitive, emitter coupled multivibrator 30 is illustrative of the control circuits 30a, 30b and 30c of FIGURE 4. An input line 31, receiving variable positive direct signal voltage corresponding to the input variable, is connected to the base 39 of a transistor 36 by a resistor 40. A positive voltage source V+ is connected to a first circuit output 33 and the collector 37 of transistor 36 by a resistor 45, and to a second circuit output 34 and the collector 42 of a transistor 41 by a resistor 46. The base 44 of transistor 41 is connected to the collector 37 of transistor 36 by a resistor 47. The emitters 38 and 43 of the respective transistors 36 and 41 are interconnected and are connected to ground through a resistor 47a.

With little or no signal input voltage in line 31, the transistor 36 is nonconducting and positive direct voltage from the source V+, applied across resistor 45, provides a high potential signal at output 33. Simultaneously, voltage from the source V+ is applied across resistor 47 and saturating current to base 44 causes transistor 41 to conduct. With transistor 41 conducting, the potential of output 34 is low. As the voltage in line 31 rises to provide sufficient current to base 39, transistor 36 starts to conduct causing the potential of output 33 and simultaneously the current applied to base 44 to drop. The interconnection between transistors 36 and 41 causes a rapid and positive change of the conductance paths, in a well-known manner, which alters the state of the circuit 30 and reverses the relative levels of potential to rescind the signal potential of output 33 and provide signal potential at output 34.

Referring specifically to FIGURE 4, three control circuits 30a, 30b and 30c, of the character shown in FIGURE 5, are connected by their respective input 31a, 31b and 31c to an input line 31 which receives a variable input signal voltage. An electronic voltage amplitude control device 29, connected to a positive direct voltage source V+ is mounted on shaft 10. The device 29 is connected to and applies input signal voltage, corresponding to the input variable, to line 31 having three resistance elements 32a, 32b and 32c located between circuit input lines 31a and 31b, 31b and 31c and 31c and ground, respectively. The circuits 30a, 30b and 30c have alternate outputs 33a and 34a, 33b and 34b and 33c and 34c, respectively. The commutating control has an output 35 of lines 35a and 35d connected to circuit outputs 33a and 34c, respectively, line 35b connected to circuit outputs 34a and 33b by an AND gate G1, and line 35c connected to circuit outputs 34b and 33c by a second AND gate G2.

With a minimum or no input control voltage, corresponding to the first step of the input variable applied to line 31, control circuits 30a, 30b and 30c are initially in their first state presenting signal voltage at their respective circuit outputs 33a, 33b and 33c. The signal voltage from circuit output 33a is applied to the first output line 35a of the commutating control to provide a signal representing the first discrete step of the input variable. The signal voltage presented by circuit outputs 33b and 33c only partially qualify AND gates G1 and G2, and no signals are presented to output lines 35b and 35c. The potential of circuit output 34c is low and provides no signal voltage to line 35d.

The signal commutating control remains in this state until the input control voltage from device 29 corresponds to the second discrete step of the input variable and is applied to line 31. The input voltage of line 31, applied to circuit 30a by line 31a alters the state of circuit 30a, and simultaneously provides a small voltage to circuit 30b by its input line 31b and the resistor 32a. With the state of circuit 30a altered, signal voltage provided by circuit output 33a is no longer available and the signal of output line 35a is rescinded. Simultaneously, circuit output 34a presents signal voltage to fully qualify gate G1, which was partially qualified by signal voltage from circuit output 33b, to apply signal voltage to output line 35b and provide a signal representing the second discrete step of the input variable.

A further increase of the input voltage to line 31, corresponding to the third discrete step of the input variable, is applied by line 31b to alter the state of circuit 30b, and simultaneously provide a small voltage to circuit 30c by line 31c and resistor 32b. The altered state of circuit 30b removes the signal voltage at output 33b to return AND gate G1 to a partially qualified state and rescind the signal of output line 35b. Simultaneously, output 34b applies signal voltage to fully qualify gate G2, receiving signal voltage from output 33c, to transmit signal voltage to output line 35c and provide a signal representing the third discrete step of the input variable.

A further increase of the input voltage to line 31, corresponding to the next step of the input variable, alters the state of circuit 30c and removes signal voltage from output 33c and gate G2 returns to a partially qualified state to rescind the signals of output line 35c. Simultaneously, output 34c applies signal voltage to output line 35d to provide a signal representing the fourth discrete step of the input variable. Because the control circuits 30a, 30b and 30c cannot provide signal voltage at both their outputs at one time, the interlock provided by input line 31 with its resistors 32a, 32b and 32c, and the control circuit operating characteristics, prevent the signal commutating device from simultaneously providing two output signals which represent two discrete steps of the input variable. Although the commutator of FIGURE 5 shows outputs 33a and 34c as individually applying signals to lines 35a and 35d to provide the first and last step signals, the first output 33a of the first circuit 30a and the second output 34c of the last circuit 30c may be eliminated from the output 35 of the device and all the step signals would be derived by fully qualifying an AND gate.

Although three embodiments of the invention have been illustrated and described in detail, it is to be expressly understood that the invention is not limited thereto. Various changes may also be made in the design and arrangement of the parts without departing from the spirit and scope of the invention as the same will now be understand by those skilled in the art.

What is claimed is:

1. A signal commutator for deriving discrete step signals as a function of a variable, comprising a plurality of control circuits, each circuit having at least one output line for transmitting a step signal and at least one semiconductor device connected to each output line to control transmission by the associated line, a voltage source connected to each of the semiconductor devices and output lines, and an input connected to all the circuits and adapted to receive control signals corresponding to the variable and including a variable resistor in each circuit which varies in value selectively with the variable to selectively control the semiconductor devices and provide the discrete step signals.

2. A signal commutator for deriving discrete step signals as a function of a variable and having a plurality of output lines for transmitting the step signals, comprising a plurality of circuits each having a pair of outputs for transmitting signals and a semiconductor device connected to each output for controlling transmission by the associated output, gating means each connected to one of the output lines and interconnecting one output of each two adjacent circuits only and being qualified by signals simultaneously applied by the associated outputs for transmitting a step signal to the associated output line, a voltage source connected to each of the outputs and semiconductor devices of all of the circuits, and an input connected to all the circuits and adapted to receive control signals corresponding to the variable for selectively controlling the semiconductor devices to provide the discrete step signals.

3. A signal commutator for deriving discrete step signals as a function of a variable having a plurality of output lines for transmitting the discrete step signals, a transistor connected to each output line for controlling transmission by the associated output line and having a base, and an input connected to all the transistor bases and adapted to receive control signals corresponding to the variable and including a resistor in each circuit to selectively control conduction of the semiconductor device in the associated circuit and provide a discrete step signal corresponding to the variable.

4. A signal commutator for deriving discrete step signals as a function of a variable, comprising a plurality of circuits, each circuit having an output line for transmitting a step signal corresponding to the variable, a transistor in each circuit having a collector connected to the associated output line to control transmission by the output line and a base to control conduction by the transistor, a voltage source connected to the collector of each transistor to provide the same potential at all the output lines, and an input connected to the bases of the transistors and adapted to receive control signals corresponding to the variable and including a resistor in each circuit which varies in value in accordance with the variable to selectively saturate the bases of the transistors and cause one of the transistors to conduct to reduce the potential at its associated output line and provide a discrete step signal.

5. A signal commutator for deriving discrete step signals as a function of a variable, comprising a plurality of circuits, each circuit having an output line to transmit a step signal corresponding to the variable, a transistor in each circuit having a collector connected to the associated output line to control transmission by the output line and a base to control conduction of the transistor, a voltage source connected to the collector of each transistor and the output lines to provide the same signal potential at all the lines, and an input connected to the bases of the transistors and adapted to receive control signals corresponding to the variable to saturate the bases causing the transistors to conduct and including a resistor in each circuit which selectively varies in value with the variable to selectively reduce the saturation of each base below a level sufficient to maintain the associated transistor conducting to provide a discrete step signal.

6. signal commutator for deriving discrete step signals in accordance with a condition as a function of a variable, comprising a power source, a plurality of control circuits each having an input connected to the power source, an output for providing a discrete step signal, a transistor connected to the output and controlling the potential at the output, and a resistor which changes resistance in accordance with the condition, connected to each transistor and responsive to the condition for controlling conductivity of the associated transistor to provide a discrete step signal at one of the outputs in accordance with the condition, the control circuits being connected to one another to provide an interlock for preventing simultaneous transmission by two outputs.

7. signal commutator for deriving discrete step signals as a function of a variable, comprising a plurality of control circuits, each circuit having at least one output for transmitting a step signal and at least one transistor connected to each output to control transmission by the associated output, each transistor having a collector and a base, a voltage source connected to each of the transistors and outputs, and an input connected to all the circuits and adapted to receive control signals corresponding to the variable and including a variable resistor in each circuit which varies selectively with the variable to selectively control the transistors and provide the discrete step signals, the transistors being collector-to-base connected through the resistors to provide an interlock for preventing simultaneous transmission by two outputs.

8. A signal commutator for deriving discrete step signals as a function of a variable having a plurality of outputs for transmitting the discrete step signals, a transistor connected to each output for controlling transmission by the associated output, each transistor having a collector and a base, and an input connected to all the transistors and receiving control signals corresponding to the variable and including a resistor in each circuit to selectively control the transistor and provide a discrete step signal corresponding to the variable, the transistors being collector-to-base connected through the resistors to provide control of each transistor by the transistor connected to its base to prevent simultaneous transmission by two associated outputs.

9. A signal commutator for deriving discrete step signals as a function of a variable, comprising a plurality of circuits, each circuit having an output for transmitting a step signal corresponding to the variable, a transistor in each circuit having a collector connected to the associated output to control transmission by the output and a base to control conduction by the transistor, a voltage source connected to the collector of each transistor to provide the same potential at all the outputs, and an input connected to the bases of the transistors and adapted to receive control signals corresponding to the variable and including a resistor in each circuit to selectively saturate the bases of the transistors and cause one of the transistors to conduct to reduce the potential at its associated output and provide a discrete step signal, the transistor being collector-to-base connected through the resistors so reduced potential at the collector of a conducting transistor prevents conduction by the transistor base connected to the conducting transistor.

10. A signal commutator for deriving discrete step signals as a function of a variable, comprising a plurality of circuits, each circuit having an output to transmit a step signal corresponding to the variable, a transistor in each circuit having a collector connected to the associated output to control transmission by the output and a base to control conduction of the transistor, a voltage source connected to the collectors of the transistor and to the outputs to provide the same signal potential at all the lines, and an input connected to the bases of the transistors and adapted to receive control signals corresponding to the variable to saturate the bases causing the transistors to conduct and including a resistor in each circuit which selectively varies with the variable to selectively reduce the saturation of each base below a level sufficient to maintain the associated transistor conducting to provide a discrete step signal, a plurality of resistors collector-to-base connecting the transistors, each resistor connecting the voltage source to the associated collector and its output so signal potential of the output transmitting a discrete step signal maintains saturation of the base of the base connected transistor.

References Cited in the file of this patent

UNITED STATES PATENTS

| | | |
|---|---|---|
| 2,767,312 | Toulon | Oct. 16, 1956 |
| 2,876,365 | Slusser | Mar. 3, 1959 |
| 3,041,469 | Ross | June 26, 1962 |
| 3,054,960 | Pearlman | Sept. 18, 1962 |